(12) United States Patent
Sivaraman et al.

(10) Patent No.: US 7,711,792 B2
(45) Date of Patent: May 4, 2010

(54) METHOD AND DEVICE FOR RETRIEVING DATA STORE ACCESS INFORMATION

(75) Inventors: Ganesh Sivaraman, Espoo (FI); Riku Mettala, Tampere (FI); Jussi Piispanen, Tampere (FI)

(73) Assignee: Nokia Corporation, Espoo (FI)

( * ) Notice: Subject to any disclaimer, the term of this patent is extended or adjusted under 35 U.S.C. 154(b) by 1307 days.

(21) Appl. No.: 10/608,889

(22) Filed: Jun. 27, 2003

(65) Prior Publication Data

US 2004/0088372 A1 May 6, 2004

(30) Foreign Application Priority Data

Jun. 28, 2002 (WO) .................... PCT/IB02/02523

(51) Int. Cl.
*G06F 15/16* (2006.01)
(52) U.S. Cl. .................. 709/217; 709/212; 709/219
(58) Field of Classification Search ............. 709/203, 709/217, 219, 245, 223, 212; 455/418, 419
See application file for complete search history.

(56) References Cited

U.S. PATENT DOCUMENTS

| | | | | |
|---|---|---|---|---|
| 6,643,506 | B1 * | 11/2003 | Criss et al. ............... | 455/419 |
| 6,721,871 | B2 * | 4/2004 | Piispanen et al. ......... | 709/217 |
| 6,839,564 | B2 * | 1/2005 | Sutinen et al. ............ | 707/10 |
| 6,925,481 | B2 * | 8/2005 | Singhal et al. ........... | 709/217 |
| 6,928,458 | B2 * | 8/2005 | Cedola et al. ............ | 707/204 |
| 6,968,358 | B2 * | 11/2005 | Freimuth et al. .......... | 709/250 |
| 6,996,818 | B2 * | 2/2006 | Jacobi et al. ............. | 709/223 |
| 7,149,813 | B2 * | 12/2006 | Flanagin et al. .......... | 707/203 |
| 7,222,139 | B2 * | 5/2007 | Mau ....................... | 707/201 |
| 7,260,382 | B1 * | 8/2007 | Lamb et al. .............. | 455/419 |
| 2002/0078075 | A1 * | 6/2002 | Colson et al. ............ | 707/204 |
| 2004/0024846 | A1 * | 2/2004 | Randall et al. ........... | 709/219 |
| 2004/0242209 | A1 * | 12/2004 | Kruis et al. .............. | 455/419 |
| 2004/0249846 | A1 * | 12/2004 | Randall et al. ........... | 707/102 |

FOREIGN PATENT DOCUMENTS

| | | |
|---|---|---|
| EP | 1081916 | 3/2001 |
| WO | 0217652 | 2/2002 |

OTHER PUBLICATIONS

"SyncML Sync Protocol", Dec. 2000, SyncML, v1.0, pp. 1-60.*
"Building an Industry-Wide Mobile Data Synchronization Protocol", 2000, SyncML, v1.0, pp. 1-14.*

* cited by examiner

*Primary Examiner*—Ramy M Osman
(74) *Attorney, Agent, or Firm*—Alfred A. Fressola; Ware, Fressola, Van Der Sluys & Adolphson LLP

(57) ABSTRACT

The present invention provides a method for generating a request for information about a data store. The request codes a data store descriptor which is used to characterize or identify a matching data store from a plurality of data stores. The re-transmitted information comprises retrieved information necessary for the requesting device or the applications executed thereon to access the identified data store, respectively. The present invention provides a method for generating a response in consequence on receiving a request for information a about data store. The data store descriptor coded in the request is used to characterize or identify a matching data store from a plurality of data stores and information about the data store is retrieved. This retrieved information coded in a response is transmitted to the previously requesting device enabling the requesting device or the applications executed thereon to access the identified data store, respectively.

12 Claims, 6 Drawing Sheets

```
 1:  <?xml version="1.0" encoding="UTF-8"?>
 2:  <SyncML xmlns='SYNCML:SYNCML1.2'>
 3:     <SyncHdr>
 4:     <VerDTD>1.1</VerDTD>
 5:     <VerProto>SyncML/1.2</VerProto>
 6:     ...
 7:     </SyncHdr>
 8:     <SyncBody>
 9:        <Alert>
10:           <CmdID>1</CmdID>
11:           <Data>224</Data> <!--Data store retrieval -->
12:           <Meta>
13:              <Type xmlns='syncml:metinf'>text/x-vcard</Type>
14:           </Meta>
15:        </Alert>
16:        <Alert>
17:           <CmdID>2</CmdID>
18:           <Data>224</Data> <!--Data store retrieval -->
19:           <Meta>
20:              <Type xmlns='syncml:metinf'>text/x-vcal</Type>
21:           </Meta>
22:        </Alert>
23:     <Final/>
24:     </SyncBody>
```

Fig. 4

```
 1:  <?xml version="1.0" encoding="UTF-8"?>
 2:    <SyncML xmlns='SYNCML:SYNCML1.2'>
 3:      <SyncHdr>
 4:        <VerDTD>1.1</VerDTD>
 5:        <VerProto>SyncML/1.2</VerProto>
 6:      </SyncHdr>
 7:      <SyncBody>
 8:        <Status>
 9:          <CmdID>1</CmdID>
10:          <MsgRef>1</MsgRef>
11:          <CmdRef>0</CmdRef>
12:          <Cmd>SyncHdr</Cmd>
13:            <TargetRef>http://syncsrv.com/servlets/SyncML</TargetRef>
14:          <SourceRef>IMEI:004400061769830</SourceRef>
15:          <Data>212</Data>
16:        </Status>
17:        <Status>
18:          <CmdID>2</CmdID>
19:          <MsgRef>1</MsgRef>
20:          <CmdRef>1</CmdRef>
21:          <Cmd>Alert</Cmd>
22:          <Data>200</Data> <!--or 415 Unsupported data type -->
23:          <Item>
24:            <Source>
25:              <LocURI>./Contact/PersonalContacts</LocURI>
26:            </Source>
27:          </Item>
28:          <Item>
29:            <Source>
30:              <LocURI>./Contact/BusinessContacts</LocURI>
31:            </Source>
32:          </Item>
33:        </Status>
34:        <Status>
35:          <CmdID>2</CmdID>
36:          <MsgRef>1</MsgRef>
37:          <CmdRef>2</CmdRef>
38:          <Cmd>Alert</Cmd>
39:          <Data>200</Data> <!--or 415 Unsupported data type -->
40:          <Item>
41:            <Source>
42:              <LocURI>./Calendar/PersonalCalendar</LocURI>
43:            </Source>
44:          </Item>
45:          <Item>
46:            <Source>
47:              <LocURI>./Calendar/BusinessCalendar</LocURI>
48:            </Source>
49:          </Item>
50:        </Status>
51:        <Final/>
52:      </SyncBody>
53:    </SyncML>
```

Fig. 5

METHOD AND DEVICE FOR RETRIEVING DATA STORE ACCESS INFORMATION

CROSS REFERENCE TO RELATED APPLICATIONS

The present application claims priority under 35 USC §119 to International Patent Application No. PCT/IB02/02523 filed on Jun. 28, 2002.

TECHNICAL FIELD

The present invention relates to a method and a device for requesting information relating to data stores and to a method and a device for returning data store information in response to a request, respectively. Particularly, the present invention relates to the requesting of information relating to data stores to be identified in accordance with data store descriptors relating to properties of the data stores or properties of the data stored in said data stores.

BACKGROUND OF THE INVENTION

The synchronization of data is a well known concept or technique for users, respectively, having at least two different electronic devices in use and processing the same kind of data with these electronic devices. In general, synchronization takes place between a terminal device (e.g., a mobile phone) and a server device (e.g., an application in a local PC or a dedicated synchronization server). Data of terminals, such as portable computers, PDA terminals (personal digital assistant), mobile stations or pagers, can be synchronized with network applications, applications of desktop computers or with other data stores of the telecommunications system, wherein the term data store should be understood as broad as possible, i.e. shall cover arbitrary sets of data. In particular, data of calendar and e-mail applications are typically synchronized.

Synchronization has been based on the use of different manufacturer-specific protocols which are incompatible. This restricts the use of terminals or data types and often causes troubles to the user. In mobile communication, in particular, it is important that data can be retrieved and updated regardless of the terminal and application used.

To improve synchronization of application data, a language known and referred to as synchronization markup language SyncML has been designed, which is based on the extensible markup language (XML). By using a SyncML synchronization protocol, which employs messages in the SyncML format, data of any application can be synchronized between networked terminals and a network server of any kind. The SyncML synchronization protocol works both in wireless and in fixed networks and supports several transmission protocols. The above presented SyncML synchronization technology addresses preferably the synchronization of data stores or databases, respectively.

The SyncML synchronization technology offers a flexible and effective method to update data store contents relating to different applications, i.e. a substantially automated method, in case that the first configuration of the synchronization required details has been managed. With reference to the SyncML synchronization, SyncML for example mandates alerting of the data stores that need to be synchronized. To alert the data stores, information, such as addresses of data stores (uniform resource identifier URI), type of the content stored by the data store, about the data stores is required. Currently this information is either entered by the user or sent as an over-the-air setting. For a user to enter the data store information, it is necessary to know both the client-side device and server-side device data stores. This is definitely cumbersome for the user when considering the possible numbers of data stores a single user may have on the client and/or server device.

Up to now, the required details are either manually entered by the user or in case of a terminal device having cellular phone communication capabilities they are transmitted as an over-the-air setting. As mentioned above, the manual entering of details is not a trivial undertaking and the user may face several problems and also contradicts an easy usability of terminals offering such a synchronization service.

Mobile communication service providers are aware that ordinary users are not familiar with or experienced in configuring one or more applications of a mobile phone, especially in view of the fact that the number of applications to be configured rises permanently and the user efforts required for proper configuring become more and more complicated due to the improvement of functions provided by the one or more applications. Hence, a procedure has been introduced allowing configuration of a mobile phone via the air interface, i.e. the over-the-air (OTA) setting procedure. The over-the-air setting is based on the short message service (SMS) provided among others in global systems for mobile communication (GSM). By the means of over-the-air setting a broad number of different setting can be managed. An over-the-air setting may contain address and property information about a data store of a server for configuring an application associated to the type of data provided for access by this data store. Such an over-the-air setting is received by a mobile phone and results that the information coded in the over-the-air setting is employed as a default configuration of the application to be configured. Individual configuration which includes for example the configuring of several data stores for one application is not possible by the means of an over-the-air setting. Nonetheless more restricting is the fact that only cellular mobile communication devices support the over-the-air setting while-of course-synchronization technology is supported by any networking devices not having necessarily the capability to communicate via cellular communication networks.

The above mentioned introduction has been presented with reference to the SyncML synchronization. But the provision of detailed information relating to a networked service is more common. The growing interlinking of networking devices by the means of wire-base and wireless communication networks and the employment of services provided centrally to a plurality of devices accessing the service causes and results in a growing configuration effort comprising the detailed defining information relating to the networked service to be properly established. A networked service shall be understood as broad as possible. For example, the networked service is provided by a network server accessible via known networks. Further, the networked service is for example also provided by a notebook, laptop, desktop etc. computer provided only to a locally connected electronic device such as a mobile phone, mobile handheld, personal digital assistant, further mobile computer etc. The networked service can be provided exclusively to only one participating or locally participating counterpart device.

SUMMARY OF THE INVENTION

The object of the invention is to provide at least one method which overcomes the above state of the art problems underlying no specific restrictions. The object of the invention is achieved with a method for generating a data store retrieval request instructing, e.g. a remote device, to transmit information relating to and retrieved from identified data store(s), a method for generating a corresponding response comprising retrieved information relating to the identified data store(s), corresponding devices adapted to perform these methods, computer programs and software tools which are disclosed in the independent claims. Additional embodiments of the invention are disclosed in the dependent claims.

According to an embodiment of the invention, a method for generating a request by a first device, e.g. a user terminal device, to obtain information relating to at least one data store is provided. The request is to be transmitted to a second device, e.g. a remote device (remote terminal device) or server device, respectively, to be processed in accordance with instructions comprised in the request. In order to clarify operations of both the first device and the second device, the first device will be termed abstractly as the requesting device or request generating device whereas the second device will be termed abstractly as the request receiving device or response generating device, respectively. The data store of which information is to be retrieved is accessible via a communication network by the requesting device (first device). The request is generated by including at least one data store descriptor and a command representation. The including of the at least one data store descriptor and a command representation may involve a coding of both, i.e. the command representation is for example a coding sequence containing one or more coding terms (instructions) all dedicated to the instructional purpose in accordance to the intention of the request according to an embodiment of the present invention. The data store descriptor is a sequence adapted to allow an identification or a characterization of at least one matching data store. Further, the including may be understood as an appending, an adding etc. The command instructs the request receiving device (second device) to identify at least one data store in accordance with the at least one data store descriptor and to retrieve information relating to said at least one identified data store. This retrieved information are to be coded in a response in order to re-transmit the retrieved information to the requesting device (first device), wherein the retrieved information are adapted to configure at least one application executed on the requesting device (first device) to enable the configured application to access the at least one identified data store, i.e. to retrieve data from the data store, to store data in the data store, to modify data of the data store, or to apply common synchronization functions, etc.

According to an embodiment of the invention, the generating of the request further comprises an identification of the at least one data store descriptor. The identification can be a retrieving of the data store descriptor from the applications to be configured. The identification can be an entering of the one or more data store descriptors by a user. Moreover, the device generating the above described request can maintain a list or database, respectively containing information about the data store descriptors and information about the assignments of the data store descriptors to applications executable on the request generating device.

According to an embodiment of the invention, one or more data store descriptors to be coded in the request are one or more descriptors of data store content types. A data store content type relates to a content type of data store dedicated to store data of a certain content type such that the storing data store is identifiable by the data store content type. According to an embodiment of the invention, one or more data store descriptors coded in the request represent one or more data content types of the one or more data stores.

According to an embodiment of the invention, the data type descriptor is a MIME (multipurpose internet mail extension) content type definition. The MIME type was originally introduced to describe the content of attachments of emails. Nowadays, the MIME type definition is extended to several networked services to define content of data exchanged in-between of networked applications to ensure the transferring of the data to an adequate application enabled to process the data. The MIME content type definition comprises a type and a subtype definition separated by a separator. Moreover, the device generating the above described request can maintain a list or database, respectively, containing information about data type descriptors, i.e. the MIME type, and information about assignments of the data type descriptors to applications executable on the request generating device.

According to an embodiment of the invention, the information relating to the at least one data store includes an address information necessary to enable applications of the requesting device (first device) to get access to the one or more identified data store.

According to an embodiment of the invention, the request is based on the synchronization markup language (SyncML) protocol.

According to an embodiment of the invention, the command of the request is a special ALERT command. An alert command specified in SyncML is a command to convey notification related information such as data synchronization request to the receiving device and thus it provides a mechanism for communicating content information, such as state information or notifications to an application on the receiving device. The ALERT command comprises an ALERT CODE instructing the aforementioned operations, i.e. instructing to initiate a data store retrieval process comprising a characterizing or identifying of at least one data store by means of the at least one descriptor. Therefore, the ALERT command further includes a META element containing a TYPE element for defining the at least one descriptor. Additionally, the request includes several ALERT commands each including the aforementioned elements and each including one descriptor. The number of ALERT commands corresponds to the number of descriptors.

According to an embodiment of the invention, a method for generating a response containing information relating to at least one data store is provided. The generation of the response is initiated upon receiving a request for information relating to the at least one data store from a requesting device (first device) via a communication network. The method comprises identifying at least one data store in accordance with at least one data store descriptor included in said received request and retrieving information relating to the at least one identified data store from the at least one identified data store and/or generating information about the data store matching and identifying process. In particular, the identifying of at least one data store in accordance with at least one data store descriptor results in a matching result representing at least one matching (i.e. identified or successfully) data store or representing information about non-matching (i.e. non-identified or unsuccessfully) result. In case at least one identified data store is successfully matched and identified, the information relating to the at least one identified data store is retrieved from at least one identified data store as mentioned above, whereas in case of an non-matching result (i.e. an unsuccessfully matching or identifying) the information relating to the at least one identified data store comprises information for informing the requesting device (first device) about the non-matching result, i.e. an exception response. The information relating to the at least one successfully and/or unsuccessfully identified data store/data store descriptors is included into the response. The including of the retrieved information into the response may involve a coding of the retrieved information to an instructional sequence expressing the retrieved information in a corresponding expression or instructional sequence adapted to be parsed by the requesting device. Such an instructional sequence may comprise one or more coding terms (instructions) all dedicated to the instructional purpose in accordance to the intention of the response according to an embodiment of the present invention. Further, the including may be understood as an appending, an adding etc. The generated response is finally transmitted to the requesting device (first device). The response comprised information relating to said at least one identified data store is further employed for configuring an application executed on the requesting device (first device) for enabling access to the at least one identified data store, wherein said retrieved information relating to said at least one data store is employed to configure at least one application executed on said requesting device (first device) to enable access to said at least one identified data store via a communication network.

According to an embodiment of the invention, the request is a request according to the aforementioned method for generating a request by a requesting device (first device) to retrieve information relating to at least one data store.

According to an embodiment of the invention, one or more data store descriptors coded in the request represent one or more data content types of the one or more data stores. According to an embodiment of the invention, one or more data store descriptors coded in the request are one or more data store content types.

According to an embodiment of the invention, the information relating to the at least one data store includes at least one address information. The address information provides an application executed on the requesting device (first device) to access the at least one data store.

According to an embodiment of the invention, the response is based on the synchronization markup language (SyncML) protocol.

According to an embodiment of the invention, the response includes at least one STATUS element. This element further includes a SOURCE element containing at least one address information of the at least one identified data store. Additionally, the response includes several STATUS elements each including an address information of one identified data store. The at least address information is coded by the means of a uniform resource identifier (URI), a uniform resource name (URN) or a combination of both the uniform resource identifier (URI) and the uniform resource name (URN).

According to an embodiment of the invention, a software tool for handling data store related information is provided. The software tool comprises program portions for carrying out the operations of the aforementioned methods when the software tool is implemented in a computer program and/or executed.

According to an embodiment of the invention, there is provided a computer program for handling data store related information. The computer program comprises program code portions for carrying out the operations of the aforementioned methods when the program is executed on a processing device, a computer or a network device.

According to an embodiment of the invention, a computer program product is provided which comprises program code portions stored on a computer readable medium for carrying out the aforementioned methods when said program product is executed on a processing device, a computer or network device.

According to an embodiment of the invention a device is provided for generating a request to retrieve information relating to at least one data store. The device includes at least a request generating component for generating the request and a network interface for transmitting the request to a request receiving device (second device) and for accessing the at least one data store via a communication network. Further, the request generating component comprises additionally a component for including at least one data store descriptor to be included in the request and a component for including a command to be included in the request. The component for including the descriptor and/or the command may comprise coding ability to generate a corresponding instructional sequence as mentioned above. Further, the including functionality of the corresponding component may be understood as an appending, an adding etc. functionality. The command instructs the request receiving device (second device) to identify at least one data store in accordance with the at least one data store descriptor, to retrieve information relating to said at least one identified data store and to return the retrieved information. Additionally, the network interface is a network interface able to transmit the request via a communication network and further to receive the instructed response. In order to decode and operate in accordance with the received response, the device also includes a parser adapted to analyze the response and to transmit extracted information relating to the identified data store to the applications requiring the extracted information or to a configuring component responsible to take account of the extracted information.

According to an embodiment of the invention, the device for generating a request is adapted to perform the aforementioned methods according to an embodiment of the invention.

According to an embodiment of the invention a device for generating a response containing information relating to at least one data store in consequence to receiving a request for information of the at least one data store from a requesting device (first device). Therefor the device comprises a network interface for receiving the request and for transmitting the response via a communication network and a response generating component for generating the response. Further the device comprises a component for identifying at least one data store in accordance with at least one data store descriptor included in the received request, a component for retrieving information relating to the at least one identified data store from the at least one identified data store and a component for including the retrieved information relating to the at least one identified data store. The component for including is comprised in the response generating component. The component for including comprise coding ability to generate a corresponding instructional sequence as mentioned above. Further, the including functionality of the corresponding component may be understood as an appending, an adding etc. functionality. The described device comprises additionally a parser able to analyze the received request and initiate the necessary operations in accordance with the coded instructions relating to the aforementioned method, wherein the initiating of necessary operations is an activating of the described components adapted to operate in accordance with the coded instructions.

According to an embodiment of the invention, the device for generating a response is adapted to perform the aforementioned methods according to an embodiment of the invention.

BRIEF DESCRIPTION OF THE DRAWINGS

The invention will be described in greater detail by means of embodiments with reference to the accompanying drawings, in which

as illustrated in FIG. 1, according to an embodiment of the invention;

FIG. 4 shows a request based on a modified XML-coding in accordance with the SyncML synchronization standard according to an embodiment of the invention;

FIG. 5 shows a response based on a modified XML-coding in accordance with the SyncML synchronization standard according to an embodiment of the invention.

DETAILED DESCRIPTION

Figure 1:
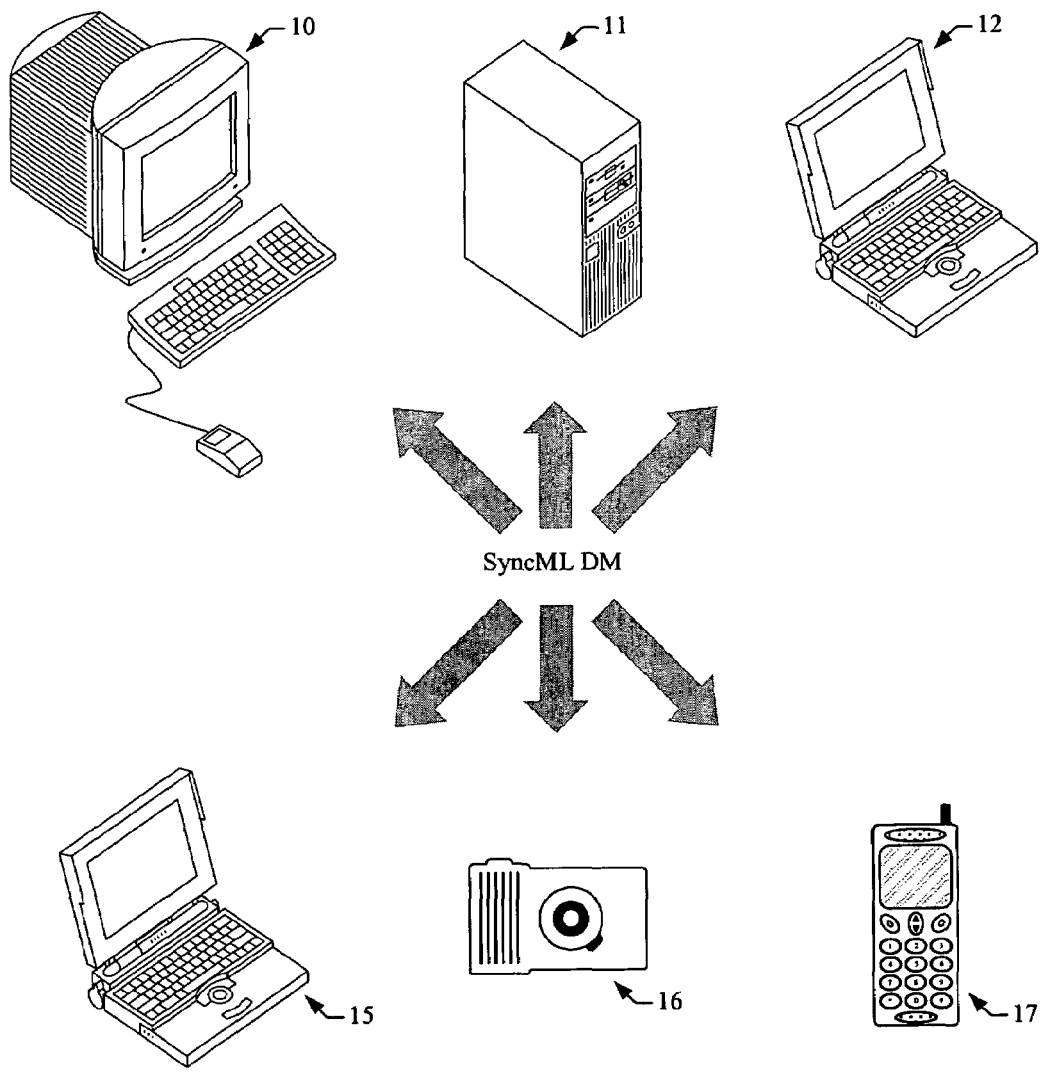
FIG. 1 shows a schematic diagram illustrating a set of exemplary electronic devices between which synchronization of information can be operated.

In the following, the embodiments of the invention will be described in a system supporting the SyncML synchronization standard without limiting the invention thereto. Information relating to the SyncML standard can be obtained from the SyncML Initiative providing publicly the full standard documentation. Same or equal parts, features and/or operations shown in the figures will be referred to using the same reference numerals.

FIG. 1 shows a schematic diagram illustrating a set of exemplary electronic devices between which synchronization of information can be operated. A certain data store content of preferably mobile terminals shall be harmonized with data store content provided by designated devices. Conventionally, mobile terminals act as synchronization clients harmonizing or synchronizing certain pre-defined data with the contents of a data store or several data stores provided by dedicated server devices. FIG. 1 illustrates a plurality of possible client devices and server devices for the synchronization operation. Typically, client devices are mobile stations like mobile phones 17 or personal digital assistants (PDA), mobile computers like notebooks 15, digital cameras 16 or personal computers (PC). Further, dedicated synchronization server devices may be desktop computers like a personal computer 10, a dedicated network server 11 or even a mobile computer like a notebook 12. It shall be noted that the client device functionality is not limited to mobile terminals as described above although the presented concept of synchronization is described in view of mobile terminals connected to dedicated serving devices.

A corresponding synchronization process in accordance with the SyncML protocol standard is established via an appropriate logical communication connection. The logical communication connection is provided by any communication network in combination with transport protocols to which the synchronization protocol is adapted. A suitable communication network may be a local area network (LAN) or a wide area network (WAN) which may comprise the internet and an intranet of a company but also wire-based serial networks such as universal serial bus (USB) or standardized serial communication (e.g. RS-232). The participating synchronization devices may be also connected via a wireless communication network such as a mobile network supporting global system for mobile communication (GSM) services and/or supporting general packet radio services (GPRS), a third generation mobile communication network such as a universal mobile telecommunication system (UMTS) network, a wireless local area network (WLAN), short range radio communication network, such as a Bluetooth network, wireless local loop (WLL) or an infrared network (IrDA). The logical communication connection between the participating synchronization devices may be provided by a single communication network of the aforementioned type but also may be provided by several communication networks of the aforementioned types interconnected by dedicated network routing devices.

With respect to the SyncML protocol standard the SyncML synchronization protocol and hence also with respect to the SyncML device management protocol standard, the SyncML device management protocol is implemented on the top of appropriate protocols in accordance with the type of employed communication network. Appropriate protocols on which top the SyncML synchronization protocol can be implemented are the hyper text transfer protocol (HTTP), the wireless session protocol (WSP) of the wireless application protocol (WAP) standard, the object exchange protocol (OBEX) used for cable connections, such as universal serial bus (USB) or RS-232, for short-range radio frequency connections (Bluetooth) or for infrared connections (IrDA), the transport control protocol/internet protocol (TCP/IP) stack and on top of the transport layer service which is offered by the e-mail protocol (e.g. simple mail transfer protocol, SMTP).

Transfer at the lower layer can be performed according to the underlying network using e.g. short messages SMS (short message service) or other signaling type transmission methods (e.g. USSD; unstructured supplementary service data), circuit-switched data calls, packet-switched data transfer services as well as paging message service, messages provided via cell broadcast and the like.

In the following the term data store shall be understood as broad as possible, i.e. shall cover arbitrary set(s) of data provided by data storage(s) to be accessed. In particular, the sets of data relate to specific applications and may be organized to meet application specific requirements such as data of calendar applications, directory applications, e-mail applications and the like. Further, the arbitrary set(s) of data can be organized in one or more databases including data records providing data to be accessed. Further the term data store shall be understood as covering network data services or networked services, respectively, i.e. shall cover arbitrary set(s) of data provided by networked service(s) to be accessed in similar to data store(s). Conventionally, networks services are based on data stores having a specific service related data store content.

The following flow diagrams depict operational sequences according to embodiments of the methods of the present invention. The depicted sequences of operations are just illustrative and not limiting thereto. Further realizations based on similar or related operational sequences are also possible.

Figure 2:
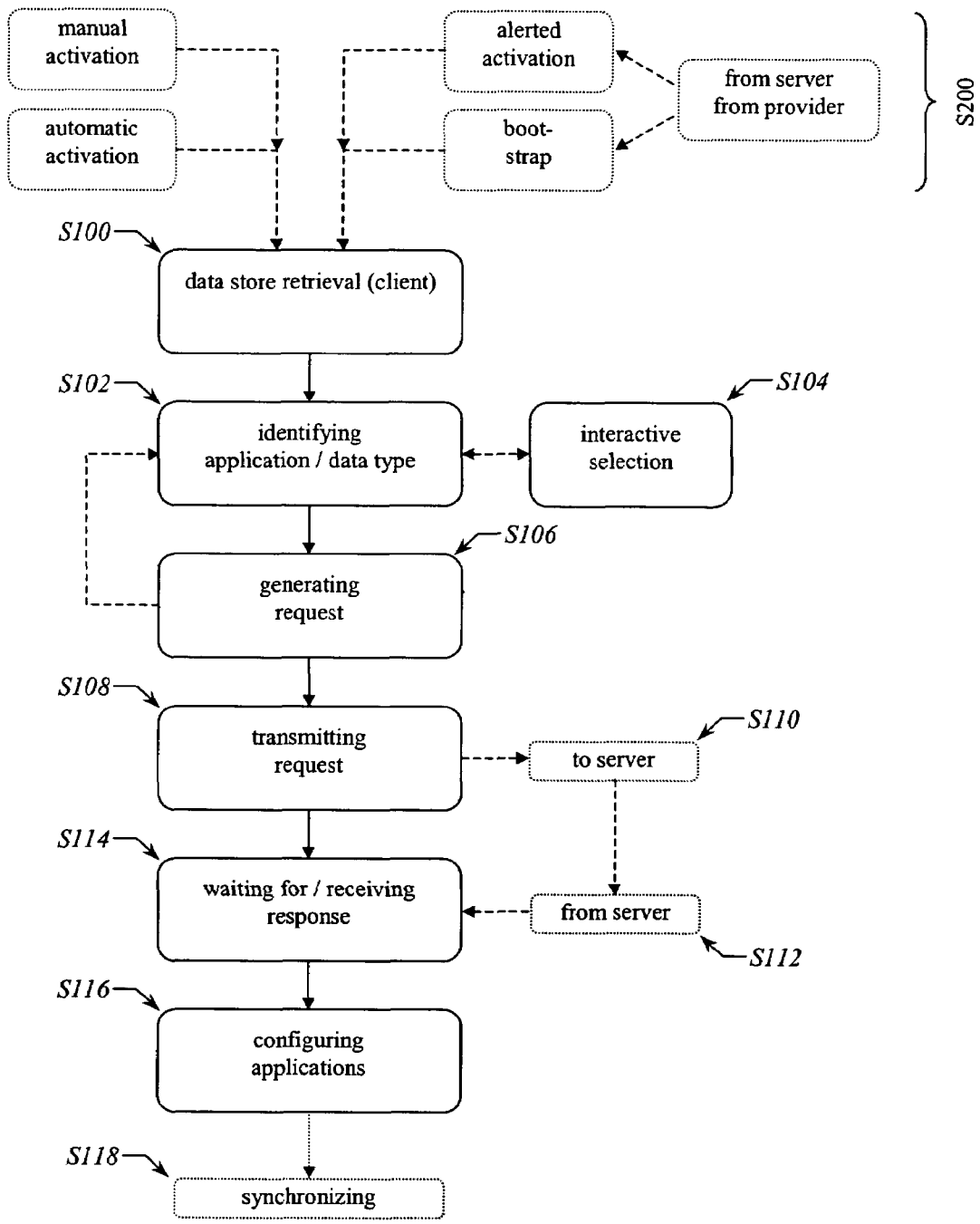
FIG. 2 shows a flow diagram illustrating an operational sequence for generating a request according to an embodiment of the invention.

FIG. 2 illustrates an operational sequence for generating a request according to an embodiment of the invention.

In an operation S100, the data store retrieval process is initiated. Particularly, the data store retrieval process relates to a retrieval of information relating to data stores, wherein the retrieval process is based on descriptions of the data stores, the data store content and/or the data stored/provided by the data store. In the following such a data store description specific to a certain data store or certain data stores will be termed as descriptor.

The kind of employed descriptor depends on the kind of data store and the kind of data stored in the data store but depends also on one or several applications accessing and/or processing data of the data stores. A valid descriptor comprises information which allows to identify a corresponding data store to be retrieved but also to identify a plurality of corresponding data stores since data may be distributed among data stores or may be made available via several data stores. Further, a physical data store can be divided into several logically different and independent data stores such that a valid data store description corresponds to a plurality of logical data stores appearing to be different.

An information relating to the data store comprises information allowing to access the data store, such as at least an address information but also information relating to access requirements and/or access limitations and the like, i.e. information required for accessing the data store. It shall be noted that the term access to a data store shall cover all possible and/or allowed handling of data stored in the data store. The handling of data is to be understood as a storing of data in the data store, a retrieval of data from the data store, a modifying of data stored in the data store, a deleting of data stored in the data store and further data manipulating processes.

The following description of the illustrated operational sequence is based on the assumption that a requesting device requests information relating to data stores provided by a data serving device. The requested information relating to the data stores shall put the requesting device itself into the situation to access the data stores of the serving device in subsequent processes. Therefore, the requesting device executes at least one application capable to access or requiring access to one or more data stores provided by the data serving device. The at least one application has to be informed about the way to access the data store and further necessary information relating the data store and the data provided by the data store.

In an operation S102, the requesting device comprises at least one application capable to access data of data stores of a serving device or several different serving devices. The descriptor of the data store to be identified is determined in accordance with the applications capable to access data of the data stores to be identified. The descriptor is based for example on a description associated with an application, on a description derived from the information supplied by an application or on a description associated with the kind of data processed by the application and provided via the data store(s). The designation kind of data relates to a data type which is to be understood as broad as possible, i.e. usually, types of data are described by an abstract description model which allows to identify different data content types such as a mime-type, a meta-type or any other data type descriptive formulation.

In accordance with data synchronization based on SyncML synchronization standard, the data type is employed as a data store descriptor, wherein a MIME-type is used to associate with a certain application. For example, data of a calendar application is to be synchronized with calendar data stored in a central data store In an operation S104, the identifying of the data store descriptor can be based on a user interaction. The user selects or defines the applications and/or the service in accordance to which one or more data stores are to be identified in order to be accessible. Moreover, the user may be allowed to select data type descriptors or data store descriptors out of a list presented to the user or enter manually such descriptors.

In an operation S106, a corresponding request is coded. The request instructs the request receiving device, here the data serving device, to look for one or more data store available to the serving device corresponding to the descriptor or descriptors contained in the request. Further, the request receiving device is instructed by the request to retransmit information relating to the one or more identified data store comprising at least an address information which allows applications executed on the requesting device to access the one or more identified data store.

The request structure is based on two structural part, a header part and a body part. The header part relates to common information such as identification of the request transmitting device, authentication information, user identification information, routing information, versioning information and the like. The body part is a container including one or more instructional sequences to be parsed by the receiving device and to be executed in accordance therewith. For example, the body part comprises one or more sets of alert sequences each representing a matching set of instructions dedicated to a descriptor for instructing the receiving device to identify one or more matching data stores.

The operations S102, i.e. identifying applications or identifying data types and corresponding data store descriptors to be coded in the request, respectively, and the operation S106, i.e. generating or coding the request, respectively, can be performed subsequently or can be performed iteratively.

In an operation S108, the generated request is transmitted to the request receiving device or the data serving device. The request receiving device can be specified, for example by a user input of an adequate device address information or alternatively may be pre-defined.

In an operation S110, the request receiving device or the data serving device receive the request, respectively, parses the request and operate in accordance with the instructional sequences comprised in the parsed request, i.e. the data serving device identifies data stores available to the requesting device and matching to the coded data store description or data type description which leads to one or more data stores providing data in accordance with the data type description. Of course, it is also possible that a corresponding data store is not available to the requesting device. In this case, the response comprises information according to the request informing the requesting device about the unavailability.

In an operation S112, the data serving device generates or codes a corresponding response, respectively, including information relating to the data store necessary to access the identified one or more data stores.

The operations S110 and S112 will be described in more detail with reference to FIG. 2 which illustrates an operations sequence of a request receiving device according to an embodiment of the invention.

In an operation S114, the requesting device receives the response, parses the received response and transmits the information relating to the identified data store(s) to the respective applications requiring configuration in accordance with the information relating to the identified data store(s) or configures directly the application(s) correspondingly.

In an operation S116, the applications of the requesting device capable to access data of the one or more identified data stores are configured in accordance with the information relating to the data store(s) comprised in the response.

In an operation S118, the configured applications are now informed about the data stores provided by data serving devices and the appropriated services can be established or used.

In an operation S200, the data store retrieval process illustrated above can be initiated by a plurality of preceding operations or processes. In the following a couple of initial processes are illustratively described.

The data store retrieval process is manually initiated, i.e. a user initiates the process, e.g. if a certain application is to be configured or an existing configuration has to be adapted to meet new requirements.

The data store retrieval process is automatically initiate, e.g. at a first activation of the requesting device an automatic configuration is offered to a user of the device in order to configure included applications or similarly, a new application installed on the requesting device is detected and the automatic configuration is activated.

The data store retrieval process is initiated by a remote device. For example, the data serving device comprising one or more data stores providing data to the receiving device is reconfigured, wherein the reconfiguration affects the accessing devices, i.e. here the requesting device, a message is transmitted to the requesting device instructing the requesting device to generate the request such that the configuration of the applications affected by the reconfiguration of the data serving device meet the new requirements.

The data store retrieval process is initiated by a bootstrap message. A bootstrap message is used to transmit configuration information to a networking device at a first logging in to adapt configuration required applications to specific network properties. Mobile communication networks, especially cellular mobile communication networks, are able to employ bootstrap messages to configure network participating devices. Commonly, bootstrap messages are transmitted from the service provider operating the mobile communication network, preferably via a push mechanism.

It shall be noted that in the aforementioned description of the operational sequence, it has been assumed that the request receiving device and the data serving device are the same devices. The presented operation can also be performed by communicating the request to a request receiving device having the capability and the information necessary to answer the request with an adapted response informing the requesting device of the actual data serving device being a separate device.

Figure 3:
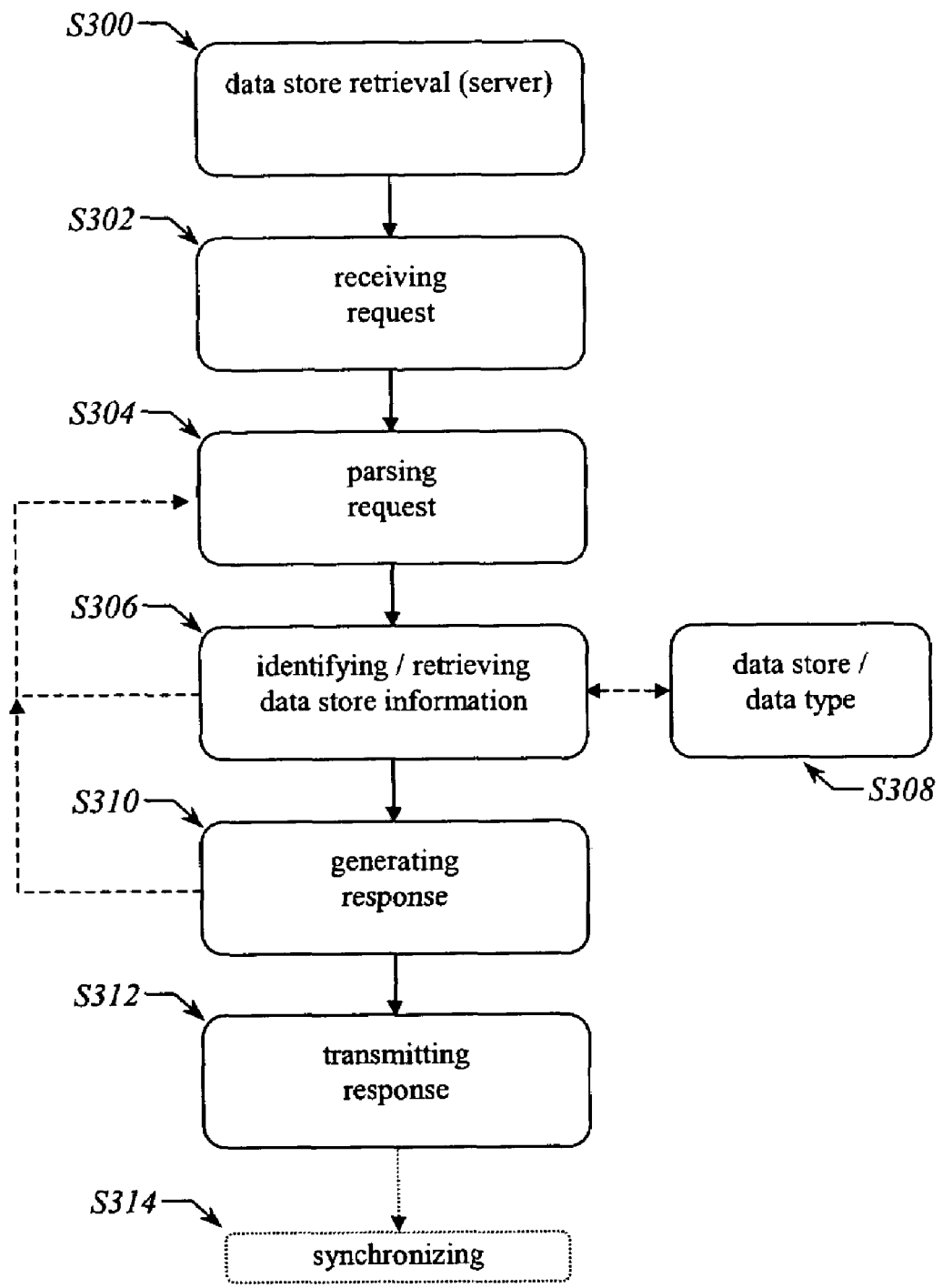
FIG. 3 shows a flow diagram illustrating an operational sequence for generating a response in reaction to a request, e.g.

FIG. 3 shows a flow diagram illustrating an operational sequence for generating a response in reaction to a request, e.g. as illustrated in FIG. 1, according to an embodiment of the invention In an operation S300, at receiving a request, the data store retrieval process is initiated.

In an operation S302, the request receiving device receives a request of the above stated kind. As described, the request contains instructional sequences instructing the receiving device to identify certain services and/or data stores and to code and retransmit a response containing retrieved information relating to the identified services and/or data stores which allows to configure applications such that they can access the identified services and/or data stores.

In an operation S304, the request is parsed by the request receiving device or by a parsing application executed thereon, respectively. The parsing application further interprets the coded instructions causing to intimate adequate processes or to transmit data to processes capable to operate accordingly. The parsing, interpreting and executing in accordance with the instructions coded in the request may involve a plurality of applications which are interconnected via application program interfaces and cooperate with each other.

In an operation S306, a data store corresponding to the data store descriptor is identified. As aforementioned, the identification is based on the coded descriptor of the data store to be identified. For example, the descriptor of data stores and/or services is based on a descriptor of a data type associated to the data stored in the data store to be identified.

The identification of a data store in accordance with the coded descriptor can further take account of additional information included in the request. For example, a device identification or a user identification may allow to look up for data stores of restricted access, i.e. only certain devices or only a certain user or a certain group of users may be allowed to access a data store and the identification or retrieval process has consider such restrictions.

In an operation S308, information relating to the one or more identified data stores and the one or more identified services are determined or retrieved, respectively. For example, the retrieved information relate to necessary information such as an address information enabling access but also to further information such as access control information, access right information and the like.

In an operation S310, the gained information are coded in a response. The response comprises a response section to each instructional sequence in the request dedicated to a data store description for retrieval. In case of a successful retrieval process information relating to the data store is coded in the respective response section. In case of a unsuccessful retrieval process the respective response section contains information relating to the unavailability, which for example results in a disabling of an application of the requesting device to avoid processing failures of the requesting device.

Analogously to the request, the response is structured in two structural parts, a header part and a body part. The header part relates to common information such as routing information, versioning information and the like. The body part is a container including one or more instructional sequences to be parsed by the receiving device and to be executed in accordance therewith. Here, the body part comprises several status information parts each representing a matching set of instructions each dedicated to a retrieval instruction set.

The operations S304, i.e. parsing and decoding the request, respectively, the operation S306, i.e. identifying at least one data store in accordance with the at least one descriptor and retrieving information relating to the at least one identified data store, and the operation S310, i.e. generating or coding the response, respectively, can be performed subsequently or can be performed iteratively.

In an operation S312, the response is re-transmitted to the requesting device.

The following figures present extracts of a request and a response corresponding to the request both based on and related to the SyncML synchronization standard extended by further adapted instructions. The SyncML meta-information is represented in a mark-up language. The meta-information is identifiable as a XML name space. The SyncML meta-information DTD (document type definition) defines the XML document type used to represent meta-information. The SyncML meta-information XML documents are specified using well-formed XML but not necessarily. The document type definition (DTD) makes heavy use of XML name spaces. Element types from the SyncML meta-information DTD can be used in other XML documents, including a SyncML message.

XML can be viewed as more verbose than alternative binary representations. This is often cited as a reason why it may not be appropriate for low bandwidth network protocols. In most cases, this DTD uses shortened element type and attribute names. This provides a minor reduction in verbosity. Additionally, the SyncML meta-information can be encoded in a tokenized, binary format.

FIG. 4 shows a request based on XML-coding in accordance with the SyncML synchronization standard according to an embodiment of the invention.

A line numbering and a subdividing of the presented code representing a request shall support the following description of structural elements. Only relevant and invention related sections of illustrated request coding are described.

A code section CS1 refers to the introducing definition section of the request. A XML coding information, a character encoding and a SyncML versioning information is defined.

A code section CS2 relates to the header section of the request. The header section contains common information, here for example, the version of the document type description is defined on which the coding of request is based. The content of the header section is standardized by the SyncML synchronization Initiative and can be looked up in detail in public standard related documents.

A code section CS300 relates to the body section of the request. This code section will be described in detail with reference to further subsections included.

A subsection CS310 relates to an alert code section. Alert code section indicates a process to be initiated to the parsing device. Here, the alert code section contains an identification code 224 in line 11 instructing to initiate a data store retrieval process such as described with reference to FIG. 3. In accordance with the current SyncML synchronization standard, the alert code 224 is actually not assigned to any process.

A subsection CS311 comprised in the subsection CS310 contains the data store description, here a data type descriptor instructing the request receiving device to identify data store (s) contain/provide data in accordance with this data type descriptor. The data type is defined as a meta-type "text/x-vcard" associated with data relating to a vcard contact managing application.

A subsection CS320 relates to a further alert code section. Here, the alert code section also contains an identification code 224 in line 18 instructing to initiate a data store retrieval process such as described with reference to FIG. 3.

A subsection CS321 comprises in the subsection CS320 contains the data store description, here a data type descriptor instructing the request receiving device to identify data store (s) contain/provide data in accordance with this data type descriptor. The data type is defined as a MIME-type "text/x-vcal" associated with data relating to a vcal calendar application FIG. 5 shows a response based on a modified XML-coding in accordance with the SyncML synchronization standard according to an embodiment of the invention.

A line numbering and a subdividing of the presented code representing a response shall support the following description of structural elements. Only relevant and invention related sections of illustrated response coding are described.

A code section CS4 refers to the introducing definition section of the response. A XML coding information, a character encoding and a SyncML versioning information is defined.

A code section CS5 relates to the header section of the response. The header section contains common information, here for example, the document type description is defined on which the coding of request is based. The content of the header section is standardized by the SyncML synchronization Initiative and can be looked up in detail in public standard related documents.

A code section CS600 relates to the body section of the response. This code section will be described in detail with reference to further subsections included.

A subsection CS610 comprises in the subsection CS600 relates to common status information related code section. The common status information includes in line 13 a base address information, designated as TargetRef, relating to the data serving device and effective to further address information comprised in the response and in line 14 an address information, designated as SourceRef, relating to the requesting device.

A subsection CS620 comprised in the subsection CS600 relates to status information corresponding to the first alert code section CS310 illustrated in FIG. 4. In accordance with the data type descriptor "text/x-vcard" included in code section C310 of the request, the response includes the corresponding data stores identified. A successful retrieving process is indicated by the code 200 in line 22. A code 415 contained in line 22 instead of the code 200 would indicate an unsuccessful retrieval process. The respective identified data stores or address information relating to the identified data stores are coded in following further subsections, respectively.

A subsection CS621 comprised in the subsection CS620 relates to a first identified data store or the address information relating to the first identified data store, respectively. The address information is coded as a relative address information relative to the base address information of included in subsection CS610, line 13. In accordance to the data type descriptor "text/x-vcard" a corresponding data store address information "./Contact/PersonalContacts" has been retrieved and coded therein.

A subsection CS622 comprised in the subsection CS620 relates to a second identified data store or the address information relating to the second identified data store, respectively. The address information is coded as a relative address information relative to the base address information of included in subsection CS610, line 13. In accordance to the data type descriptor "text/x-vcard" a corresponding data store address information "./Contact/BusinessContacts" has been retrieved and coded therein.

The number of identified data stores codeable in the response request is not limited.

Further subsection similar to the subsections CS621 or CS622 can be included in the subsection CS620.

A subsection CS630 comprises in the subsection CS600 relates to status information corresponding to the second alert code section CS320 illustrated in FIG. 4. In accordance with the data type descriptor "text/x-vcal" included in code section C320 of the request, the response includes the corresponding data stores identified. A successful retrieval process is indicated by the code 200 in line 39. A code 415 contained in line 39 instead of the code 200 would indicate an unsuccessful retrieval process. The respective identified data stores or address information relating to the identified data stores are coded in following further subsections, respectively.

A subsection CS631 comprised in the subsection CS630 relates to a first identified data store or the address information relating to the first identified data store, respectively. The address information is coded as a relative address information relative to the base address information included in subsection CS610, line 13. In accordance to the data type descriptor "text/x-vcal" a corresponding data store address information "./Contact/PersonalCalendar" has been retrieved and coded therein.

A subsection CS632 comprised in the subsection CS630 relates to a second identified data store or the address information relating to the second identified data store, respectively. The address information is coded as a relative address information relative to the base address information included in subsection CS610, line 13. In accordance to the data type descriptor "text/x-vcal" a corresponding data store address information "./Contact/BusinessCalendar" has been retrieved and coded therein.

The number of identified data stores codeable in the response request is not limited. Further subsection similar to the subsections CS631 or CS632 can be included in the subsection CS630.

The illustrated status information of subsections CS620 and CS 630 corresponding to the data type descriptor included in the subsections CS310 and CS320 each comprise data store address information. The status information are not limited to address information but can also include further information relating to the access requirements, access rights, data store preferences and properties and the like.

The illustrated address information is coded as a uniform resource identifier. Further address information coding can be employed. For example, the coding can be based on uniform resource identifier and uniform resource name coding which may be also combined.

Figure 6:
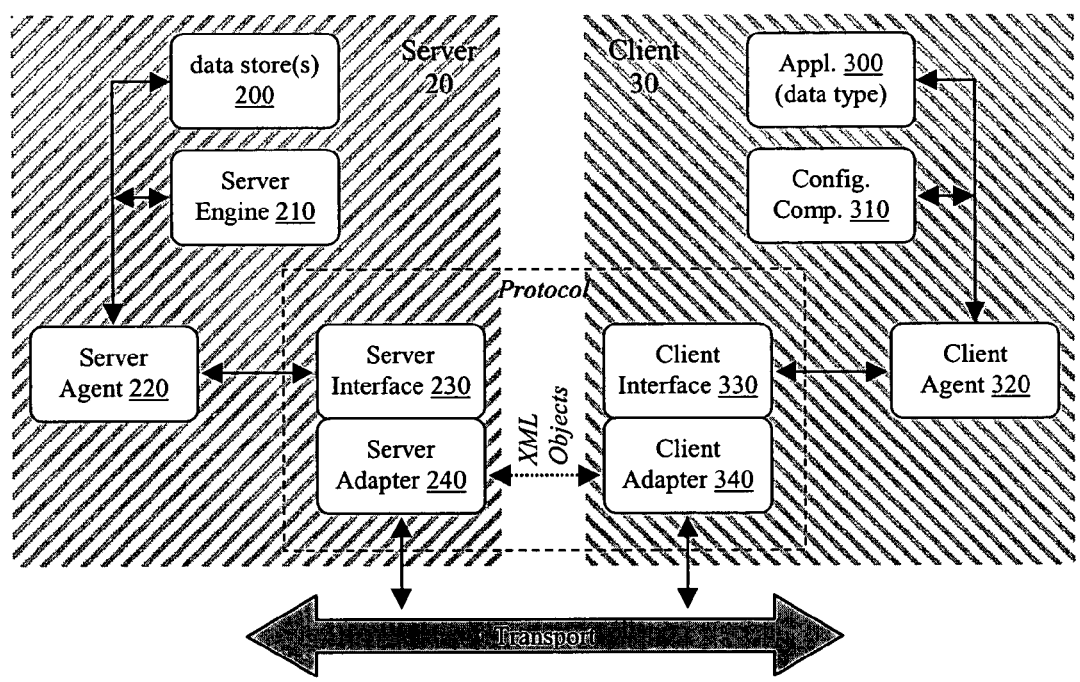
FIG. 6 shows a block diagram illustrating components of a client device and a server device for synchronization according to an embodiment of the invention.

FIG. 6 illustrates components of a client device 30, i.e. aforementioned as requesting device, and a server device 20, i.e. aforementioned as request receiving or data serving device, respectively, for synchronization according to an embodiment of the invention.

A server device agent 220 represents a networked service that provides the possibility to exchange messages such as messages in accordance with the aforementioned request and response, respectively, with another counterpart client device agent 320. Further, the server device agent 220 and the client device agent 320 are capable and responsible for coding and/or decoding of the request and response, respectively. The server device agent 220 is hosted by the server 20 which may be a server device corresponding to the server device mentioned with reference to FIG. 1. Analogously, the client device agent 320 is hosted by the client 30 which may be a client device corresponding to the client device mentioned with reference to FIG. 1.

The server 20 and client 30 are connected over a network. The network provides a logical communication connection between the server 20 and client 30, allowing the establishment of the end-to-end communication. A selection of logical connections and bearers thereof are described in FIG. 1.

The client 30 may use the client device agent 320 to access the network and send messages to the server via the client adapter 340 and client interface 330, for example in accordance to the SyncML protocol standard. The client adapter 340 and the client interface 330 provides an adaptation of the messages to be transmitted and/or to be received to the logical and physical requirements in accordance with the employed communication network. Correspondingly, the server 20, server device agent 220 and the server engine 210, respectively, receives or sends messages via the server adapter 240 and server interface 230 and manages the data stores 200 provided to the client 30 to be accessed. The server adapter 240 and the server interface 230 provides an adaptation of the messages to be transmitted and/or to be received to the logical and physical requirements in accordance with the employed communication network. Message transmission operations are for example conceptually bound into a device frame, which is a conceptual frame for one or more required packages.

The client 30 has the ability by means of the client device agent 320 to code a data store retrieval request in view of the applications 300 operable with the device or the data types required by the applications 300. The server 20 is able by the means of the server device agent 220 to decode the request and by the means of the server device engine 210 to parse the received request, to operate the retrieval process in accordance with the instructions and one or more descriptors comprised in the request and finally to supply information to the server device agent 220 to code a corresponding response basing on information relating to the data store(s) 200. The parsing and processing of the request may be executed by the server device engine 210 and can be supported by a certain component specialized to identify one or more data stores in accordance with the descriptor and to retrieve information relating to the data store.

The response received by the client 30 is decoded by the means of the client device agent 320 and the decoding results are supplied to a configuration component 310 able to configure the applications 300 in accordance with the information relating to at least one data store decoded from the response request. The configuring component 310 can be supported by the client device agent 320 able to parse the received response and able to transmit only relevant processed information to the configuration component 310.

The configured applications may employ the described client device interface 330 and client device adapter 340 to communicate to the data serving device comprising the one or more data stores. Here, the server device 20 comprises the data stores and communication with the data stores may be performed through the server device adapter 240, the server device interface 230 and the server device engine 210 operating as a data store managing interface. Conveniently, the data stores to be accessed by the configured applications of the client device 30 may be provided by a dedicated separate serving device, i.e. separate from the depicted server device 20. Therefore, the server device 20 can comprise the necessary requested information to operate the described methods or the server device 20 can retrieve the necessary requested information from the dedicated serving device.

The respective components necessary to operate the methods according to embodiments of the invention and designated to the client device and server device with reference to FIG. 5 have to be implemented (also) within the particular device, i.e. the specific method related components of the client device in the server device and vice versa.

It shall be noted, that the implementation and the embodiments of the client device 30 and server device 20 is based on embodiments of synchronizing devices in accordance with the SyncML synchronization standard. Particularly, the basic operations of the server device engine 210, the server device agent 220 and the client device agent 320 are derived from these basic embodiments. According to an embodiment of the present invention, these components being based on the SyncML synchronization standard have an improved functionality, i.e. the functionality in accordance with the SyncML synchronization standard and the functionality described with respect to the aforementioned methods according to embodiments of the invention and the aforementioned devices according to embodiments of the invention.

It will be obvious for those skilled in the art that as the technology advances, the inventive concept can be implemented in a different and broader number of ways. The invention and its embodiments are thus not limited to the examples described above but may vary within the scope of the claims.

The invention claimed is:

1. A method comprising:
generating a request at a user terminal device for retrieving information stored in at least one data store in another device,
transmitting said generated request to said other device, which is specified by a predefined address information thereof; and
applying said retrieved information received by said user terminal device to configure one or more applications executable thereat to enable said applications accessing said at least one data store to obtain data of at least one content type therefrom,
wherein said request comprises:
at least one data store descriptor suitable for characterizing said at least one data store, said at least one data store descriptor identifying at least one content type of data stored in said at least one data store; and
a command for instructing said other device to identify at least one data store matching said at least one data store descriptor, to retrieve information relating to said at least one identified data store and to return said retrieved information relating to said at least one identified data store to said user terminal device,
wherein said information relating to said at least one identified data store comprises address information of said at least one data store relative to said predefined address information of said other device, and
wherein data of said at least one content type is provided at said user terminal device.

2. The method according to claim 1, wherein said generating comprises:
identifying said at least one data store descriptor to be coded.

3. The method according to claim 1, wherein said at least one data store descriptor comprises at least one data type descriptor relating to at least one data content type.

4. The method according to claim 3, wherein said data type descriptor is a multipurpose Internet mail extension content type definition.

5. The method according to claim 1, wherein said retrieved information relating to said at least one data store includes an address information for enabling access to said at least one data store.

6. The method according to claim 1, wherein said request is based on the synchronization markup language protocol.

7. The method according to claim 6, wherein said command of said request is a modified ALERT command having a specific ALERT CODE and includes a META element containing a TYPE element for defining said at least one data store descriptor.

8. The method according to claim 1, further comprising:
retrieving data stored on said at least one identified data store using said one or more configured applications executed on said user terminal device in a subsequent process.

9. The method according to claim 1, wherein said retrieved information relating to said at least one identified data store includes at least one of access control information, access right information, data store preferences and data store properties.

10. A computer readable storage medium storing program code, said program code for execution by a processor, such that when executed causes the processor to perform:
generating a request at a user terminal device for retrieving information stored in at least one data store in another device,
transmitting said generated request to said other device which is specified by a predefined address information thereof, and
applying retrieved information received by said user terminal device to configure one or more applications executable thereat to enable said applications accessing said at least one identified data store to obtain data of at least one content type therefrom,
wherein said request comprises:
at least one data store descriptor suitable for characterizing said at least one data store, said at least one data store descriptor identifying at least one content type of data stored in said at least one data store; and
a command for instructing said other device to identify at least one data store matching said at least one data store descriptor, to retrieve information relating to said at least one identified data store and to return said retrieved information relating to said at least one identified data store to said user terminal device,
wherein said information relating to said at least one identified data store comprises address information of said at least one data store relative to said predefined address information of said other device, and
wherein data of said at least one content type is provided at said user terminal device.

11. A user terminal device, comprising:
a request generating component configured to generate a request for retrieving information stored in at least one data store in another device;
a network interface configured to transmit said request to said other device which is specified by a predefined address information thereof; and
a processor configured to apply said retrieved information received by said user terminal to configure one or more applications executable thereat to enable said applications accessing said at least one identified data store to obtain data of at least one content type therefrom;
wherein said request generating component comprises:
a component configured to include at least one data store descriptor in said request, said descriptor being suitable for characterizing said at least one data store, said at least one data store descriptor identifying at least one content type of data stored in said at least one data store; and
a component configured to include a command into said request, said command instructing said other device to identify at least one data store in accordance with said at least one data store descriptor, to retrieve information relating to said at least one identified data store and to return said retrieved information relating to said at least one identified data store to said user terminal device,
wherein said information relating to said at least one identified data store comprises address information of said at least one data store relative to said predefined address information of said other device, and
wherein data of said at least one content type is provided at said user terminal device.

12. A user terminal device, comprising:
means for generating a request for retrieving information stored in at least one data store in another device;
means for transmitting said request to said other device which is specified by a predefined address information thereof; and
means for applying said retrieved information received by said user terminal to configure one or more applications executable thereat to enable said applications accessing said at least one identified data store to obtain data of at least one content type therefrom;
wherein said means for generating a request comprises:
means for including at least one data store descriptor in said request, said descriptor being suitable for characterizing said at least one data store, said at least one data store descriptor identifying at least one content type of data stored in said at least one data store; and
means for including a command into said request, said command instructing said other device to identify at least one data store in accordance with said at least one data store descriptor, to retrieve information relating to said at least one identified data store and to return said retrieved information relating to said at least one identified data store to said user terminal device,
wherein said information relating to said at least one identified data store comprises address information of said at least one data store relative to said predefined address information of said other device, and
wherein data of said at least one content type is provided at said user terminal device.

\* \* \* \* \*